United States Patent
Adnan et al.

(10) Patent No.: US 6,968,905 B2
(45) Date of Patent: Nov. 29, 2005

(54) DISTRIBUTED CONTROL SYSTEM

(75) Inventors: Sarmad Adnan, Sugar Land, TX (US); Shunfeng Zheng, Houston, TX (US); Matthew D. Rouse, Stafford, TX (US); Weibin Lu, Houston, TX (US); Kent C. Opel, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 78 days.

(21) Appl. No.: 10/390,972

(22) Filed: Mar. 18, 2003

(65) Prior Publication Data

US 2004/0182574 A1    Sep. 23, 2004

(51) Int. Cl.[7] .................. E21B 43/00; E21B 19/22; G05D 3/12; G06F 3/00; G06F 13/00
(52) U.S. Cl. .................. 166/384; 166/66; 166/77.2; 166/113; 166/250.01; 166/53; 701/2; 348/114; 73/152.19; 710/8; 710/15; 710/62
(58) Field of Search .................. 166/250.01, 381, 166/384, 853, 65.1, 66, 75.4, 77.1, 77.2–77.4, 166/113, 243, 335, 363; 701/2, 117; 378/84, 378/85, 114; 73/152.19, 152.54, 452.39; 710/8–19, 710/62–77

(56) References Cited

U.S. PATENT DOCUMENTS

| | | | |
|---|---|---|---|
| 4,706,120 A | * 11/1987 | Slaughter et al. | ........... 348/114 |
| 4,940,095 A | * 7/1990 | Newman | ..................... 166/378 |
| 5,351,533 A | * 10/1994 | Macadam et al. | ........ 73/152.31 |
| 5,826,654 A | * 10/1998 | Adnan et al. | .......... 166/250.01 |
| 5,904,724 A | * 5/1999 | Margolin | ..................... 701/120 |
| 5,947,213 A | * 9/1999 | Angle et al. | .................. 175/24 |
| 5,996,029 A | * 11/1999 | Sugiyama et al. | ............ 710/15 |
| D436,519 S | 1/2001 | Shampine | |
| D442,891 S | 5/2001 | McCafferty et al. | |
| D443,560 S | 6/2001 | McCafferty et al. | |
| 6,264,128 B1 | 7/2001 | Shampine et al. | |
| 6,273,188 B1 | 8/2001 | McCafferty et al. | |
| 6,321,596 B1 | * 11/2001 | Newman | ................. 73/152.45 |
| 6,405,132 B1 | * 6/2002 | Breed et al. | ................ 701/301 |
| 6,457,534 B1 | 10/2002 | Rolovic et al. | |
| 2002/0062190 A1 | * 5/2002 | Hameleers et al. | ......... 701/117 |
| 2002/0193938 A1 | * 12/2002 | DeKock et al. | ............. 701/117 |
| 2003/0125866 A1 | * 7/2003 | Mori et al. | .................. 701/117 |
| 2004/0019413 A1 | * 1/2004 | Bonilla et al. | ................. 701/2 |
| 2004/0024502 A1 | * 2/2004 | Squires et al. | ................ 701/33 |

* cited by examiner

*Primary Examiner*—Jennifer H. Gay
(74) *Attorney, Agent, or Firm*—Tim Curington; Robin Nava

(57) ABSTRACT

A distributed control system for local or remote control of equipment. The distributed control system provides a communication bridge through a local control panel between a non-real-time network, and a real-time network, such as a controller area network. Both soft real-time and hard real-time networks are suitable, but hard real-time is preferred. Multiple distributed control units are used to control various equipment components. The distributed control system may be applied in any environment. The distributed control system may be applied to a skid-mounted coiled tubing unit.

21 Claims, 2 Drawing Sheets

DISTRIBUTED CONTROL SYSTEM

BACKGROUND OF THE INVENTION

1. Field of the Invention

This invention relates to distributed control and automation of equipment. In one application, this invention may be used to control a coiled tubing unit. Depending on the control system configuration, equipment operation may be controlled by an on-site or a remotely located operator.

2. Description of Related Art

Real-time communication systems are the backbone of distributed control applications. The timeliness of real-time communications is important in a complex distributed real-time system. Use of a non-real-time network with a distributed control system that relies upon real-time communications presents challenges not addressed in the prior art. In a distributed control system, there is a need to integrate and bridge a non-real-time network with a real-time network to efficiently control equipment, for example on a plant floor. In combination, the non-real-time network, and the real-time network allow both local and remote control of equipment. This control architecture is readily expandable. The present invention has many different applications, but it finds particular application in the oil and gas industry and specifically to coiled tubing operations.

Coiled tubing is increasing in popularity as a method of drilling wells and conducting operations in an oil or gas wellbore. Coiled tubing is used as a continuous strand and is therefore easier and faster than conventional pipe in many applications, such as drilling wells, deploying reeled completions, logging high angle boreholes, and deploying treatment fluids. Coiled tubing is particularly useful in horizontal or multilateral wells.

Coiled tubing units or rigs have been used in the oil and gas industry for many years. They are used both on land and offshore for various types of operations. One common operation is often referred to in the industry as "sand cleanout". During production, sand from surrounding formations may partially or completely plug a well. A coiled tubing unit will be brought to the wellsite to remove the sand from the well. The coiled tubing is run into the well and fluid is circulated down through the coiled tubing into the well. The fluid and the sand circulate up the annulus and out the wellhead where the sand is removed. This process frequently puts a well back into production or at least improves production. As mentioned above, coiled tubing units are used for various other operations including, but not limited to, matrix acidizing and nitrogen kickoff.

For most offshore operations, the coiled tubing unit has been modularized. The coiled tubing unit may be deployed from a ship or a platform. The coiled tubing unit equipment package typically consists of the following items: injector head, stripper, coiled tubing reel, power pack, control cabin, and the blow-out preventer (BOP). After all of this equipment had been delivered to an offshore platform, the coiled tubing unit must be set up and numerous hydraulic hoses must be connected. Equipment set up and take down will often take several hours on an offshore well. The coiled tubing job itself may run from several hours to several days. There is a need to reduce the amount of time it takes to set up and take down a coiled tubing unit on an offshore well. There is also a need to reduce the total weight of the coiled tubing equipment package sent to offshore operations.

To facilitate transportation to and from an offshore location, each of the following components is typically mounted on a separate skid: the coiled tubing reel, the injector head and stripper, the power pack, and the control cabin. The major components of the coiled tubing reel typically include the following: reel drum, reel drive system, levelwind assembly, reel swivel, and manifold. The major components of the power pack commonly include the following: engine, hydraulic pumps, pressure control valves, hydraulic reservoir, filters, strainers, heat exchangers, and hydraulic fluid. As previously mentioned, the control cabin is skid-mounted, although it may also be incorporated with the power pack. The control cabin contains all the necessary controls and instruments to allow the coiled tubing operation to be run by an on-site operator. A transparent window allows the operator to view the other components during the job. The major injector head components often include the following: hydraulic motors, drive chains, chain tensioners, gooseneck, weight indicator, stripper, and air brake. Various types of BOP's can be used, but quad BOP's are often encountered. Quad BOP's frequently include blind rams, shear rams, slip rams, pipe rams, and equalizing valves.

Coiled tubing units are deployed from trucks or trailers for land-based wells. An example of a mobile coiled tubing unit is described in U.S. Pat. No. 6,273,188, which is incorporated herein by reference. The coiled tubing unit includes a tractor and a trailer. The control cabin and power pack are mounted on the tractor. The trailer supports the coiled tubing reel, injector head, and a mast that can be raised during operations or lowered during transit. The mast supports the injector head above the well during operations. The BOP can also be transported on the trailer, or it can be transported to the well by a separate conveyance.

On both land-based and offshore-based coiled tubing units, numerous hydraulic hoses run between the different equipment components. There is a need to reduce the number of hydraulic hoses, hydraulic connections, and the number of skids for coiled tubing units. In general, fewer hydraulic hoses and connections reduce the number of oil leaks, which is economically beneficial as maintenance costs are reduced. Fewer oil leaks also benefit the environment. If the number of skids is reduced, it means less equipment cost for the operation.

U.S. Pat. Nos. 6,264,128 and 6,457,534 also describe apparatus and methods that may be used with coiled tubing units, namely a levelwind system for the coiled tubing reel and a method of reducing pipe fatigue by eliminating short movements, and are incorporated herein by reference.

BRIEF SUMMARY OF THE INVENTION

The invention defines an equipment control system consisting of a distributed control system operating on a real-time network linked to a non-real-time network and at least one control and/or monitoring station. An operator is able to control the equipment from a master control station. The master control station and the operator may be located proximate the equipment, in order to view its operation. "Proximate" as used herein means that the operator is close enough to, and can make meaningful unaided visual observations of, the equipment in operation so that these visual clues may assist the operator in proper operation of the equipment. For example, if the operator is in a control booth with windows and the operator has an unimpeded view of the equipment, then such operator and the control station are proximate the equipment. In the alternate configuration, the master control station and the operator may be remotely located. The term "remote" as used herein is the opposite of "proximate". Remote means distant from the equipment, such that the operator cannot visually observe operation of the equipment without the aid of some optical apparatus such as a video camera. For example, if the operator's view is obstructed, or the equipment is too distant, or the operator's control booth lacks windows, then the operator and the control station are remote. Furthermore, an operator located onshore will not be able to visually observe the operation on an offshore platform without the aid of a video camera or other optical apparatus, therefore, the operator is considered to be remote. When the operator and the master control station are remotely located, it may be desirable and in some cases indispensable to have one or more video input devices (video cameras) positioned proximate the equipment and one or more electronic displays (video monitors) located near the operator to facilitate observation of the equipment. Sound input devices positioned proximate the equipment may also facilitate monitoring of operations by a remote operator. One or more wellsites may be operated from a single remote control station. Split screen technology may be used to reduce the number of electronic displays required. Ancillary control stations may be used to monitor operations. The control stations have the ability to switch functionality, such that an ancillary control station can assume control of the operation and act as the master control station. This gives the control system an added degree of flexibility and safety. This switching is regulated by a safety protocol that ensures that the switching is completed without complications, such as loss of control, and dual control of the equipment.

The master control station is connected to a local control panel (LCP) by an ETHERNET or other non-real-time network. The LCP is connected to a plurality of distributed control units (DCU) by a controller area network or other real-time network. Both hard real-time and soft real-time networks are suitable in this invention. However, hard real-time networks are preferred. The LCP provides a bridge between the non-real-time network and the real-time network. The DCU's control various equipment and mechanical components in the system. The control architecture of the present invention is readily expandable.

Each DCU and/or the LCP may have control algorithms that provide various levels of control over the equipment. It is preferred that each DCU and/or the LCP have control algorithms that automate the operation of equipment without the intervention of the operator. In this preferred embodiment, each DCU and/or the LCP is programmed to execute a completed task without the intervention of the operator. For example, when a coiled tubing unit operator issues a command to change the injector skate pressure from 500 psi (35 kg/square cm) to 1000 psi (70 kg/square cm) or increase the injector speed from 25 feet/minute (7.6 meters/minute) to 60 feet/minute (18.3 meters/minute), the DCU or LCP performs this task in a controlled manner without additional input from the operator: The DCU and LCP can use open-loop and closed-loop (modifying output based on sensor feedback) control to manipulate the equipment. It is also preferred to program each DCU and/or the LCP to monitor, predict, and automatically control one or a number of critical parameters so that operation limits (also referred to as the operating envelope) will not be exceeded.

In one application, this invention can be used for the remote control of a coiled tubing unit. As previously discussed, a coiled tubing unit typically consists of the following equipment: injector head, stripper, coiled tubing reel, power pack, control cabin, and BOP. To safely conduct a coiled tubing operation, the operator typically must coordinate operation of these different components, under various conditions, while closely monitoring the equipment, especially the coiled tubing reel. Existing automated control systems for coiled tubing operations are generally programmable logic controller (PLC) based, where each individual PLC communicates with sensors and electromechanical devices for the equipment. These prior art control systems do not have remote control capability and their safety features are quite limited. The present invention discloses a new control system for automated coiled tubing operations that has a distributed control architecture and remote control and monitoring capability. The present invention includes fail-safe features and equipment self-diagnosis.

The present invention takes the guesswork out of the operation of a coiled tubing unit. By relying on DCU's and the LCP to automate, monitor, predict, and control operation, the invention increases the safety of the operation and reduces the required skill level of the operator. Various pre-determined operating parameters or limits, hereinafter referred to as an "operating envelope" may be loaded into the master control station, one or more DCU's, and/or the LCP. A safe operating envelope can be developed based on past experience for a variety of different functions and different situations. The term operating envelope can refer to a single set of operating parameters, multiple sets of parameters, and even calculated values. The present invention reduces the amount of hydraulic hose and the number of connections, which makes it easier and faster to set up and take down. Hose reduction also makes the system more reliable because of fewer leaks. These features make the present invention more economical to operate than prior art units. In a skid mounted coiled tubing unit, the present invention further eliminates the need for a control cabin. This reduces the overall weight of equipment delivered to an offshore platform and saves on equipment cost.

DETAILED DESCRIPTION OF THE INVENTION

Figure 1:
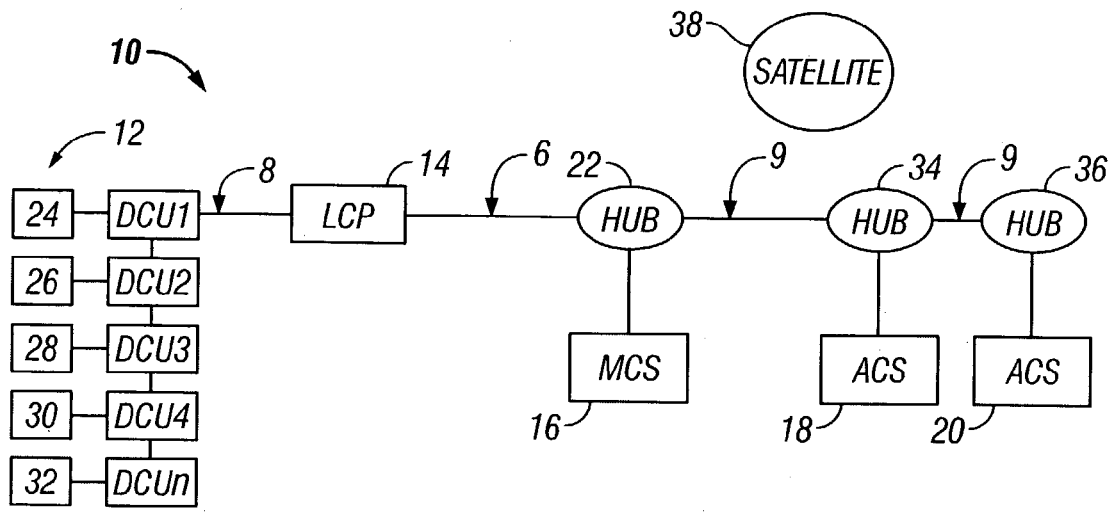
FIG. 1 is a block diagram of the control architecture for the present distributed control system.

FIG. 1 is a block diagram of the control architecture for the present distributed control system 10. The invention shown in FIG. 1 can be applied to any field of automation and is not limited to oil and gas industry applications. For example, the distributed control system 10 may be used to control one or more assembly lines on a plant floor or other equipment generally identified by the numeral 12. A number of sensors, electrical and/or electromechanical devices are used to control, monitor or diagnose the equipment 12. A number of DCU's are at the equipment end to control or monitor these sensors or devices. These DCU's communicate with the local control panel (LCP) 14 through the real-time network 8. It should be noted that the LCP need not be a physical device, but may instead be a software program. The DCU's may also communicate with one another. The master control station 16 connects to the LCP 14 through the non-real-time network 6. The master control station 16 assumes full control and monitoring capability over the equipment 12 and operation thereof. The operator uses various input devices (such as joysticks, key pads, buttons, knobs and switches) at the master control station 16 and issues commands, while the DCU's execute these commands to operate the equipment 12. There may be a slight delay between actuation of an input device and equipment response because of the interface between the non-real-time and real-time networks, as well as the inherent delays in the non-real-time network. Likewise, there may be a slight delay between sensor detection of operational data and display of the data on an output device at the master control station 16. A number of control stations may be connected locally, for example at the plant floor to enable real-time control and monitoring of the operation, or control stations may be located remotely. Various fail-safe features may be embedded in the control system, as will be discussed later. The system may also contain various types of features for equipment self-diagnosis, as will be discussed later. It should be noted that any combination of features discussed herein are within the scope of this invention. For control purposes it may not be necessary that the DCU's communicate among themselves, but for fail-safe features and equipment self-diagnosis, communication among the DCU's may be necessary.

In FIG. 1, the operator is located proximate master control station 16 which is located proximate the equipment to be controlled 12. This physical proximity allows the operator to visually observe the equipment 12. In alternative embodiments the operator and the master control station 16 can be located remote from the equipment 12. In the remote controlled embodiment, it may be desirable, and in some cases indispensable, to have at least one video input device proximate the equipment 12 transmitting a live video feed of the premises back to at least one electronic display that can be viewed by the operator. In the remote controlled embodiments, it may also be desirable to have at least one sound input device proximate the equipment 12 to transmit sound signals of the equipment to at least one sound output device so the equipment noise may be heard by a remote operator. Sound input devices may include, but are not limited to, microphones (piezoelectric, carbon, ribbon, dynamic, and capacitor), transducers, sound level meters, and dosimeters. Sound output devices may include, but are not limited to, speakers, transducers, and vibratory diaphragms.

In FIG. 1, ancillary control stations 18 and 20 are located remote to the location of master control station 16. During operations only one control station at a time may actually control the distributed control system 10. In this example, control station 16 has been designated the "master" control station. But, in other situations, control station 18 or control station 20 may also be the "master". In the embodiment of FIG. 1, ancillary control stations 18 and 20 are for remote monitoring of operations. At least one video input device may be located proximate the equipment 12 to transmit live video feed of the premises back to at least one electronic display positioned proximate the control stations 18 and 20. This allows the remote observers at control stations 18 and 20 an opportunity to watch the equipment 12 in operation and if appropriate, to make comments back to the operator at master control station 16. At least one sound input device may be located proximate the equipment 12 to transmit sounds and noise from the equipment 12 back to at least one sound output device positioned proximate the control stations 18 and 20. This allows remote observers at control stations 18 and 20 an opportunity to hear the equipment 12 in operation and, if appropriate, to make comments back to the operator at master control station 16. This sound monitoring system is optional.

The master control station 16 connects to a hub 22 and the LCP 14 by a non-real-time network generally identified by the numeral 6, such as an ETHERNET. Other non-real-time networks, such as a token ring, ARCNET, and MAP, are also suitable for this application. The LCP 14 connects to a plurality of distributed control units, designated DCU1, DCU2, DCU3, DCU4, and DCUn by a real-time network, generally identified by the numeral 8, such as a controller area network (CAN). The CAN is a serial protocol, which efficiently supports distributed real-time control with a very high level of security. Other real time networks or protocols such as FIREWIRE also suitable for this connection. DCU1 is used to control and monitor apparatus 24. DCU2 is used to control and monitor apparatus 26. DCU3 is used to control and monitor apparatus 28. DCU4 is used to control and monitor apparatus 30. DCUn is used to control and monitor apparatus 32. Additional DCU's may be added up to the network maximum. It is within the scope of the present invention that one or a plurality of DCU's control a single piece of equipment. It is also within the scope of the present invention that one or a plurality of pieces of equipment be controlled by a single DCU.

A sensor network is used to monitor and send various types of sensor data from the equipment 12 back to the control stations. The sensor data is displayed on various output devices, such as gauges, lights, or computer displays. Various sensor networks may be used such as SMART DISTRIBUTED SYSTEM (SDS), PROFIBUS, CANOPEN or DeviceNet. However, in this embodiment SDS is the preferred sensor network used in conjunction with the CAN real-time network. For simplicity, this combination will hereinafter be referred to as SDS/CAN. The LCP 14 is located proximate the equipment 12, for example on a plant floor or at a wellsite. The LCP 14 contains one or more central processing units (CPU's) and acts as a bridge between the non-real-time network and the real-time network. Each DCU also has one or more CPU's. The CPU in the LCP may or may not be used to store and/or calculate fail-safe parameters, to transmit control signals, to store and accumulate sensor data involving performance in a memory storage device, or to generate maintenance notices. The CPU's in the various DCU's may or may not be used to store and/or calculate fail-safe parameters, to transmit control signals, to store and accumulate sensor data involving performance, or to generate maintenance notices.

In a preferred embodiment, each DCU or the LCP 14 may have control algorithms that provide various levels of control over the equipment. It is preferred for each DCU or the LCP 14 to have control algorithms that automate the operation of equipment 12 without the intervention of the operator. In this preferred embodiment, each DCU or the LCP 14 is programmed to execute a complete task without the intervention of the operator. It is also preferred to program each DCU or the LCP 14 to monitor, predict, and automatically control one or a number of critical parameters so that the operating envelope will not be exceeded.

As shown in FIG. 1, the ancillary control station 18 connects to a hub 34 and through the INTERNET 9 to hub 22. Likewise, ancillary control station 20 connects to a hub 36 and through the INTERNET 9 to hub 34 and to hub 22. In this fashion, the observers at remote ancillary control stations 18 and 20 can monitor the activities of the operator, the instruments, and sensor readings that appear on various output devices at the master control station 16 that are being viewed by the operator. Depending on the network performance, available hardware as well as distances involved, communication between hub 22 and hubs 34 and 36 may be wired or wireless. Satellite communications 38 may also be suitable.

This control architecture provides an equipment neutral control system. The control architecture is applicable to any equipment regardless of its power supply. The equipment may be powered by electricity, hydraulics, or other forms of energy. The architecture is highly expandable both at the equipment end and the operator end. It provides the platform for remote operation. It also provides the platform for automated operation of equipment, coordinated operations to ensure fail-safe operation, and equipment self-diagnosis.

Figure 2:
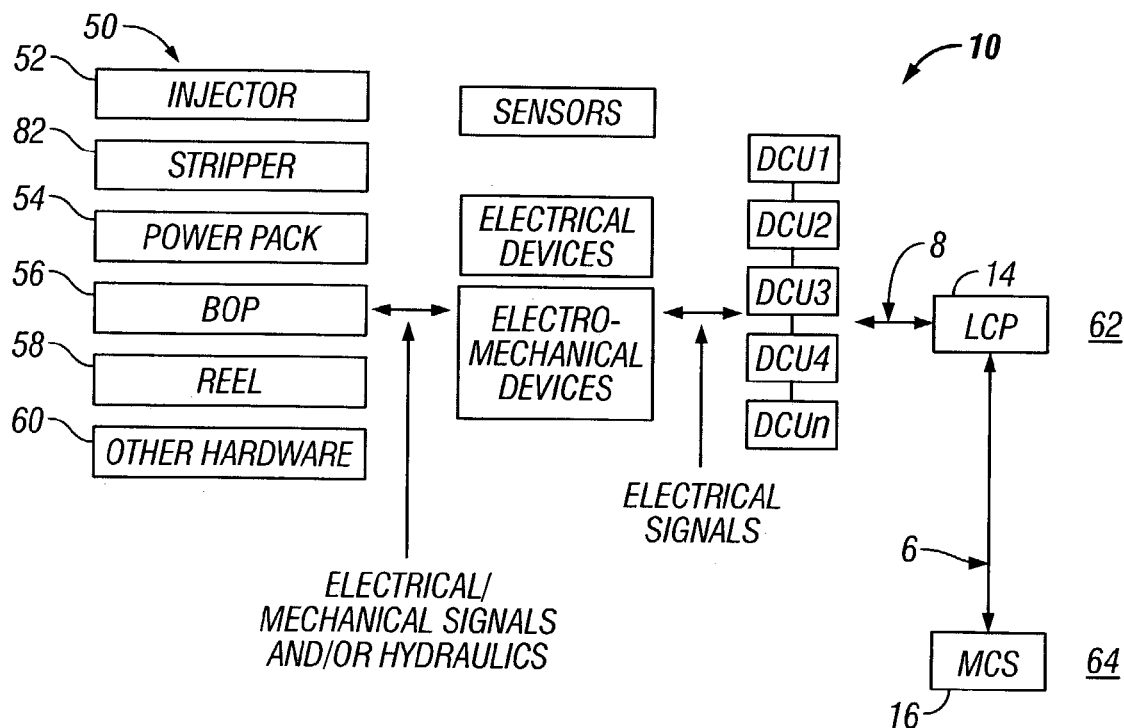
FIG. 2 is a block diagram of a coiled tubing unit and the present distributed control system.

FIG. 2 is a block diagram of a conventional coiled tubing unit and the present distributed control system. The coiled tubing unit is generally identified by the numeral 50 and may be skid-mounted or truck-mounted. Various components include the injector 52, the stripper 82, the power pack 54, the BOP 56, the coiled tubing reel 58, and other hardware 60.

The control architecture consists of two communication networks. At the equipment end, generally referred to by the numeral 62, the communication is based on a real-time network 8, such as SDS/CAN. At the operator end, generally identified by the numeral 64, the communication is based on a non-real-time network 6, such as ETHERNET. The LCP 14, located at the equipment end 62, serves to bridge these two networks.

A number of sensors, electrical and/or electromechanical devices are used to control, monitor or diagnose the equipment. A number of DCU's are at the equipment end 62 to control or monitor these sensors or devices. These DCU's may communicate with each other and with the LCP 14 through the real-time network, such as SDS/CAN. Additional DCU's can be easily added to or subtracted from the SDS/CAN bus, making it a highly expandable system to accommodate different equipment or control features. As an option, each individual DCU may have its own independent control features and may make independent decisions without operator input. As an option, the DCU's may communicate with one another such that coordinated operations among themselves can be accomplished without operator intervention. These features enable fail-safe automation of equipment which will be discussed in greater depth with regard to FIG. 3.

A master control station 16 connects to the LCP 14 through a non-real-time network 6, such as ETHERNET. The master control station 16 assumes full control and monitoring capability over the coiled tubing unit 50. Control commands issued from the master control station 16 are transmitted through the non-real-time network 6 to the LCP 14, converted into real-time network commands, such as SDS/CAN bus commands, and delivered to the appropriate DCU's.

A number of other control stations may be connected locally or remotely to enable real-time monitoring of the operation. When multiple control stations are used, only one control station assumes the role of issuing control commands and is referred to herein as the "master" control station. All other control stations can only be used to monitor the operation. Depending on the network performance, available hardware as well as the distance between the equipment end 62 and the operator end 64, communications may be wired or wireless.

Figure 3:
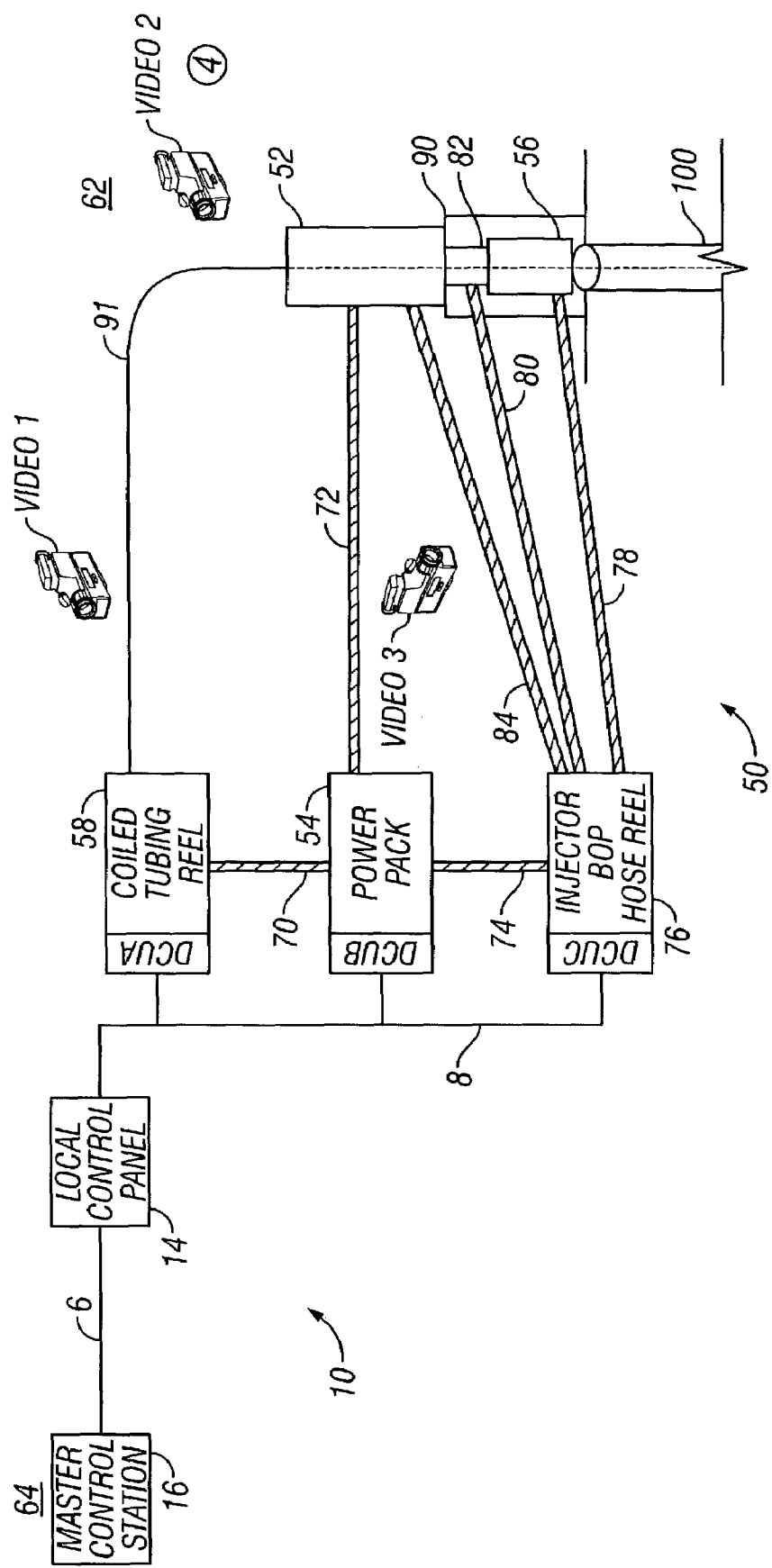
FIG. 3 is another block diagram of the present distributed control system operating a coiled tubing unit, including the primary hydraulic lines used to power the unit.

FIG. 3 is another block diagram of the present distributed control system 10 operating a coiled tubing unit 50 including the primary hydraulic lines used to power the coiled tubing unit. In this example, the coiled tubing unit 50 is being used to do work on a producing offshore well 100.

The distributed control system 10 includes a plurality of sensors, electrical and/or electromechanical devices, three DCU's, identified as DCUA, DCUB, and DCUC, a LCP 14, a master control station 16, a non-real-time network 6, and a real-time network 8. Although only one control station is shown, other control stations may be connected to the system for monitoring purposes. In this example, the master control station 16 is located locally on the offshore platform and the operator can visually observe the coiled tubing unit 50 when positioned at the master control station 16.

However, in alternative embodiments, the master control station 16 and the operator may be remotely located, for example at an on-shore facility. When the operator and the master control station 16 are remote from the coiled tubing unit 50, it will be necessary for a plurality of video input devices to be located at the equipment end 62 to send live video feed of the operations back to one or more electronic displays located proximate the operator, so the operator can visually observe the operations at the equipment end 62. The electronic displays may include cathode ray tubes, plasma screens, liquid crystal diode displays, and other types of displays to observe video signals. In this example, video input device 1 is positioned to send live video signals of the coiled tubing reel 58. Video input device 2 is positioned to send live video signals of the injector head 52, and video input device 3 is positioned to send live video signals of the stripper 82, BOP 56, and the wellhead. Other video input devices may be located at the equipment end 62 to better observe operations from a remote location. These additional video input devices may be fixed in orientation or they may be adjustable by the remote operator. Sound input device 4 is positioned near the injector head 52. Sounds from the injector head 52 and other equipment are transmitted back to sound output devices proximate the master control station 16 to allow an operator to hear the sounds that are being generated at the equipment end 62. Several sound input devices may be used at the equipment end 62 to facilitate operations.

The master control station 16 has at least two interfaces for operators to issue control commands. The hardware interface has a plurality of input devices (such as buttons, joysticks, keypads) that provide the operator quick and easy access to control features such as injector speed/direction control, levelwind override, BOP activation, or emergency shutdown. The software interface allows the operator to control the other features, such as engine throttle, reel back tension, etc. In addition, the software interface also provides parameters for system monitoring purposes. Together, the hardware and software interfaces in the master control station 16 allow the operator complete control and monitoring of the coiled tubing operation.

The LCP 14 serves a number of functions. Internally, it serves to bridge the different communication networks. In this example, it bridges the non-real-time network and the real-time SDS/CAN. The LCP 14 is a programmable network protocol conversion, control, and data acquisition device. The LCP 14 can perform two-channel bi-directional SDS/CAN (Smart Distributed System/Controller Area Network) to Ethernet conversion. It allows remote host computers to interface with the SDS/CAN bus. This allows non-real-time systems to perform real-time control by handing over the real-time response functions to the LCP. As an option, the LCP 14 may monitor the network performance of the SDS/CAN bus and the non-real-time network and enforce a fail-safe status in case of network failure. The LCP 14 may also monitor, predict and control the performance of an operation, much like each individual DCU. Finally, the LCP 14 may serve as a secondary user interface. It may allow operators to issue critical commands, such as emergency shutdown, and to view key system parameters, such as wellhead pressure.

Three DCU's, DCUA, DCUB, and DCUC, are used to communicate with sensors, and electrical and/or electromechanical devices. Although the exact number and arrangement of the DCU's are variable due to the flexibility of the control system, the following discussion will address the specific case presented in FIG. 3. Each DCU is programmed to execute a completed task without the intervention of the operator. For example, when a coiled tubing unit operator issues a command at the master control station 16 to change the injector skate pressure from 500 psi (35 kg/square cm) to 1000 psi (70 kg/square cm) or increase the injector speed from 25 feet/minute (7.6 meters/minute) to 60 feet/minute (18.3 meters/minute), the DCU performs this task in a controlled manner without additional input from the operator. The DCU can use open-loop and closed-loop (modifying output based on sensor feedback) control to manipulate the equipment. Each DCU is also programmed to monitor, predict, and automatically control one or a number of critical parameters so that the operating envelope will not be exceeded. In order to execute a complete task, a DCU may have to communicate and coordinate with other DCU's. DCUA controls the operation of the coiled tubing reel 58 and associated components through sensors, and electrical and/or electromechanical devices. DCUB controls the operations of the power pack 54 and associated components, including hydraulic pressure supplied to all coiled tubing components, through sensors, and electrical and/or electromechanical devices. DCUC controls the operations of the injector head 52 and associated components including the stripper 82 and the BOP 56 through sensors, and electrical and/or electromechanical devices.

Conventional coiled tubing units are hydraulically operated. The control cabin of a conventional coiled tubing unit has hydraulic hoses running to and from the power pack, and other operational components including the coiled tubing reel, the injector bead, and the BOP. In the present invention, the control cabin of the conventional coiled tubing unit is completely eliminated. Furthermore, in the present invention, there are no hydraulic hoses running from the master control station 16 to any other component in the coiled tubing unit. This eliminates more than 20 percent of the hydraulic hosing used by conventional skid-mounted coiled tubing units. The master control station 16 communicates with the local control panel 14 over a non-real time network, such as ETHERNET. The signals exchanged between the master control station 16 and the local control panel 14 are sent over conductors or they may be wireless. Regardless of how they are exchanged, there is no need for a control cabin as in a conventional coiled tubing unit, and there are no hydraulic hoses running to the master control panel 16 of the present invention. This makes the coiled tubing units easier and faster to set up and take down. Ultimately this makes the present invention more economical to operate. It also makes it more reliable because there will be fewer leaks.

The local control panel 14 communicates with DCUA, DCUB, and DCUC through a real-time network, such as SDS/CAN. These command signals are exchanged over conductors. Hydraulic hoses 70 connect between the power pack 54 and the coiled tubing reel 58 allowing fluid communication between these components. Hydraulic hoses 72 connect between the power pack 54 and the injector head 52 allowing fluid communication between these components. Hydraulic hoses 74 connect between the power pack 54 and the injector/BOP hose reel 76 also allowing fluid communication between these components. The hydraulic hoses 70, 72, and 74 allow pressurized hydraulic fluid from the hydraulic pump (not shown) to flow to the other components of the coiled tubing unit 50 to provide the necessary energy to operate the various hydraulic motors and other equipment well known to those skilled in the art.

Additional hydraulic hoses 78 connect between the hose reel 76 and the BOP 56 allowing fluid communication between the power pack 54, the hose reel 76, and the BOP 56. Other hydraulic hoses 80 connect between the hose reel 76 and the stripper 82 allowing fluid communication between the power pack 54, the hose reel 76, and the stripper 82. Hydraulic hoses 84 connect between the hose reel 76 and the injector head 52 allowing fluid communication between the power pack 54, the hose reel 76, and the injector head 52. The hydraulic hoses 78, 80, and 84 allow pressurized hydraulic fluid to flow from the hydraulic pump (not shown) on the power pack 54 through the hose reel 76 to the BOP 56, the stripper 82, and the injector head 52.

The injector head 52 may be mounted on a stand 90, which is sometimes called a "jack stand" in the industry. In the alternative, the injector head 52 may be suspended from a crane or a mast. The BOP 56 connects to the wellhead in a manner well known to those skilled in the art.

The DCU's are properly programmed to execute control signals issued from the master control station 16 as relayed by the local control panel 14. Once a DCU receives a command (control signal), it has the full processing power to execute the command by issuing relevant commands.

Many automation and fail-safe features including operating envelopes may be built into the distributed control system 10 by utilizing the processing power in each individual DCU and/or the LCP 14, as well as the ability of the DCU's to communicate with one another. Any one or all of these automation and fail-safe features are within the scope of the present invention. One of the automation features is the automated tripping of the coiled tubing 91 into and out of the well 100. This is accomplished by programming the DCU responsible for the injector speed to run the injector according to a speed profile versus the well depth. Another automation feature is the automated pull-test of the coiled tubing, in which the DCU responsible for the injector speed is programmed to stop the injector, run the injector in reverse direction (out of the hole) for a prescribed distance, stop the injector again, and then proceed to run the injector in the in-hole direction. Yet another automation feature is the automated reel tension control. This is accomplished by programming the DCU responsible for the reel tension to automatically adjust the reel motor pressure to maintain a target reel tension. Another automation feature is automated pressure control. This is accomplished by programming the DCU responsible for a particular feature pressure, such as skate pressure, to automatically adjust the opening and closing of the corresponding pressure control valve to maintain a target pressure setpoint. For example, the feature pressures can be skate pressure, chain tension pressure, or stripper pressure. Yet another automation feature is the power pack engine speed control, in which the DCU responsible for the power pack engine is programmed to adjust the engine throttle to maintain an engine speed setpoint. It should be noted that in order to achieve these control features, communication and cooperation among the DCU's and/or LCP 14 may be necessary.

The fail-safe features for the control system address communication, equipment, and operation failures. Communication failure may occur between the master control station 16 and the LCP 14, such as the loss of non-real-time network signal. If it happens, the LCP 14 will be able to detect such failure and place the control system in a default safe state and alert the personnel, as programmed, without the intervention of the operator. The master control station 16 is also able to detect such a failure and alert the operator. Communication failure may also occur at the SDS/CAN bus 8. This includes the complete loss of communication signal on the bus 8 or loss of a particular signal, such as weight signal or depth signal. The DCU's are programmed to detect such a signal failure and are able to act upon such failure to place the control system in a default safe state without the intervention of the operator. The LCP 14 will also detect the failure and alert the operator. Equipment failure may occur as a result of component failure leading to loss of hydraulic pressure, for example, the loss of skate pressure. In this case, the DCU responsible for such a feature is programmed to detect such a failure, alert the operator, and attempt to correct such a failure automatically without the intervention of the operator. In the case of the loss of skate pressure, the DCU is programmed to detect the source of leakage and isolate the leakage such that normal operation may proceed. In the case of hydraulic fluid pressure, the minimum operating pressure may be loaded into the DCU's and the LCP 14. Depending on the severity of the pressure loss, operation shutdown may be initiated by the DCU's without the intervention of the operator. A failure in the control loop between a DCU and a piece of equipment (includes DCU output failure, electrical Wring damage between the DCU and equipment, hardware output device failure, and sensor failure) will result in an apparent loss of control. In this case, the operator will be notified of this control failure and the DCU's will place the control system in a default safe state without the intervention of the operator.

The DCU's in the present control system may be programmed to detect, correct, and prevent many potentially costly equipment and operational failures. A common failure mode in current coiled tubing operations is the complete failure (collapse) of the injector gooseneck, and possibly the collapse of the injector and the reel, as a result of a high reel back tension coupled with a high skate pressure and positive injector speed (in-hole direction). This kind of failure is due to the lack of coordination while manually operating different components of the coiled tubing unit, namely, the reel back tension, the skate pressure, and the injector speed control. Such a failure mode is easily preventable in the present control system. The present control system has the DCU's programmed to coordinate the operation of all these different components so proper reel back tension is maintained all the time when the injector chain is moving. If for some reason the reel brake is set, the DCU's will automatically prevent the movement of the injector chain. Another fail-safe feature is the prevention of operation failure due to downhole obstruction. When a moving coiled tubing hits a downhole obstruction, timely response is necessary to prevent a complete operation failure such as the kinking ("corkscrew") and the subsequent parting of the coiled tubing. However, human response is usually not fast enough to prevent such a failure. In the present control system, the DCU's are programmed to detect the occurrence of downhole obstruction by various means, such as the weight change per time interval, or weight change per depth interval. Once the DCU's detect the downhole obstruction, they will automatically stop the coiled tubing movement and thus prevent operation failure. Another important fail-safe feature in the present control system is the automated detection and correction of coiled tubing runaway, which is discussed below.

Coiled tubing runaway is an operational safety issue and may cause damage to the well and the equipment. Determination of a safe operating envelope and loading such data into the system can help reduce the occurrence of coiled tubing runaway. The automated detection and correction of coiled tubing runaway is achieved by the interaction of LCP 14, DCUA, DCUB, and DCUC and associated equipment. DCUC detects a slip condition in which the coiled tubing speed is higher than the injector running speed and attempts to correct it by increasing the skate pressure in order to match the injector chain speed with the coiled tubing speed. The skate, also called "inside chain tensioner", supplies the force to grip the coiled tubing such that when the injector chain moves, the coiled tubing also moves accordingly in the in-hole or out-hole direction. When such an attempt fails and the coiled tubing speed exceeds the prescribed runaway speed, for example 300 feet/minute (91.4 meters/minute), DCUC automatically sends emergency control signals to apply emergency skate pressure and the maximum stripper pressure. If such a measure brings the coiled tubing speed under control, then the runaway has been corrected and DCUB slowly reduces the injector head speed to stop. If the coiled tubing speed cannot be controlled, then the runaway is going to continue until the coiled tubing hits the bottom of the well. In this case, the injector speed and skate pressure are reduced to a minimum to prevent coiled tubing failure, such as kinking ("corkscrew"), as a result of pressing the coiled tubing after it hits the bottom of the well.

Yet another fail-safe feature is the automated coiled tubing break strength control. Determination of a safe operating envelope and loading such data into the system can help reduce the occurrence of broken coiled tubing. The DCU's and/or the LCP 14 are programmed to periodically predict the progression of the coiled tubing axial stress and downhole pressure for the immediate time ahead. If the combined stress of the predicted axial stress and the stress due to downhole pressure on the coiled tubing exceeds the working limit of the coiled tubing, then emergency control signals may be issued by the LCP 14 and/or one or more DCU's to cause automatic shutdown.

The present control system can further be used for equipment self-diagnosis. For this purpose a number of diagnostic sensors may be installed on the coiled tubing unit 50 and connected to the DCU's. These sensors may be used to measure a number of the equipment performance indicators, including wear and tear, deformation, pressure cycle, and oil leakage. These sensors can also track operation of the equipment and alert operators that maintenance is due or of a missing scheduled maintenance. Specifically, these sensors may be used to monitor and accumulate the stress cycle, pressure cycle, operating time, and coiled tubing running footage for the injector head, reel, and other equipment components and their associated pressure conduits, such as hoses and fittings. In addition, the sensors may be used to monitor engine hours and speed on the power pack 54. One or more DCU's and/or the LCP 14 may send maintenance notices and or warnings to the master control station 16. Alarms may also be triggered when maintenance is due and such alarm signals may be sent to remote control stations that may be monitoring operations. It is noted that any combination of the automation, fail-safe features, and equipment self-diagnosis features discussed herein are within the scope of the present invention.

What is claimed is:

1. A method for distributed control of a coiled tubing unit comprising:
   operating an input device at a control station to transmit control signals from the control station across a non-real-time network to a local control panel (LCP);
   converting and transmitting the control signals from the control station across a real-time network to at least one distributed control unit (DCU);
   transmitting the control signals from the at least one DCU to the at least one piece of coiled tubing unit equipment;
   sensing sensor data from at least one piece of coiled tubing unit equipment and transmitting the sensor data across the real-time network from at least one DCU to the LCP;
   converting and transmitting the sensor data from the LCP across a non-real-time network to at least one output device at the control station; wherein the LCP bridges communication between the non-real-time network and the real-time network; and
   wherein the at least one DCU comprises a power pack DCU, coiled tubing reel DCU, and an injector head/BOP DCU, the method further comprising:
      sensing a non-real-time network signal failure; and
      transmitting control signals to one or more of the power pack DCU, the coiled tubing reel DCU, and the injector head/BOP DCU when the non-real-time network signal failure is sensed.

2. A method for distributed control of a coiled tubing unit comprising:
   operating an input device at a control station to transmit control signals from the control station across a non-real-time network to a local control panel (LCP);
   converting and transmitting the control signals from the control station across a real-time network to at least one distributed control unit (DCU);
   transmitting the control signals from the at least one DCU to the at least one piece of coiled tubing unit equipment;
   sensing sensor data from at least one piece of coiled tubing unit equipment and transmitting the sensor data across the real-time network from at least one DCU to the LCP;
   converting and transmitting the sensor data from the LCP across a non-real-time network to at least one output device at the control station; wherein the LCP bridges communication between the non-real-time network and the real-time network; and
   wherein the at least one DCU comprises a power pack DCU, coiled tubing reel DCU, and an injector head/BOP DCU, the method further comprising:
      sensing a non-real-time network signal failure; and
      transmitting control signals to one or more of the power pack DCU, the coiled tubing reel DCU, and the injector head/BOP DCU when the non-real-time network signal failure is sensed.

3. A method for distributed control of a coiled tubing unit comprising:
   operating an input device at a control station to transmit control signals from the control station across a non-real-time network to a local control panel (LCP);
   converting and transmitting the control signals from the control station across a real-time network to at least one distributed control unit (DCU);
   transmitting the control signals from the at least one DCU to the at least one piece of coiled tubing unit equipment;
   sensing sensor data from at least one piece of coiled tubing unit equipment and transmitting the sensor data across the real-time network from at least one DCU to the LCP;
   converting and transmitting the sensor data from the LCP across a non-real-time network to at least one output device at the control station; wherein the LCP bridges communication between the non-real-time network and the real-time network; and
   wherein the at least one DCU comprises a power pack DCU, a coiled tubing reel DCU, and an injector head/BOP DCU, the method further comprising:
      sensing a non-real-time network signal failure; and
      transmitting control signals to one or more of the power pack DCU, the coiled tubing reel DCU, and the injector head/BOP DCU when the sensor data signal failure is sensed.

4. A method for distributed control of a coiled tubing unit comprising:
   operating an input device at a control station to transmit control signals from the control station across a non-real-time network to a local control panel (LCP);
   converting and transmitting the control signals from the control station across a real-time network to at least one distributed control unit (DCU);
   transmitting the control signals from the at least one DCU to the at least one piece of coiled tubing unit equipment;
   sensing sensor data from at least one piece of coiled tubing unit equipment and transmitting the sensor data across the real-time network from at least one DCU to the LCP;
   converting and transmitting the sensor data from the LCP across a non-real-time network to at least one output device at the control station; wherein the LCP bridges communication between the non-real-time network and the real-time network; and
   wherein the coiled tubing unit comprises a power pack to supply power to other components of the coiled tubing unit, a coiled tubing reel, an injector head, a stripper, and a BOP, and wherein the at least one DCU comprises a power pack DCU, a coiled tubing reel DCU, and an injector head/BOP DCU, the method further comprising:
      converting and transmitting the control signals from the control station across a real-time network to one or more of the power pack DCU to control the operation of the power pack, the coiled tubing eel DCU to control operation of the injector head, the stripper, and the BOP; and
      sensing sensor data and transmitting the sensor data across the real-time network from one or more of the power pack DCU, the coiled tubing reel DCU, and the injector head/BOP DCU to the LCP.

5. A method for distributed control of a coiled tubing unit comprising:
   operating an input device at a control station to transmit control signals from the control station across a non-real-time network to a local control panel (LCP);
   converting and transmitting the control signals from the control station across a real-time network to at least one distributed control unit (DCU);
   transmitting the control signals from the at least one DCU to the at least one piece of coiled tubing unit equipment;
   sensing sensor data from at least one piece of coiled tubing unit equipment and transmitting the sensor data across the real-time network from at least one DCU to the LCP;

converting and transmitting the sensor data from the LCP across a non-real-time network to at least one output device at the control station; wherein the LCP bridges communication between the non-real-time network and the real-time network; and wherein the at least one DCU comprises a power pack DCU, a coiled tubing reel DCU, and an injector head/ BOP DCU, the method further comprising:

transmitting and sharing the sensor data among one or more of the power pack DCU, the coiled tubing reel DCU, the injector head/BOP DCU, and the LCP; and calculating fail-safe parameters and comparing against a pre-loaded operating envelope and automatically transmitting control signals from one or more of the power pack DCU, the coiled tubing reel DCU, and the injector head/BOP DCU when the pre-loaded operating envelope is violated.

6. A method for distributed control of a coiled tubing unit comprising:

operating an input device at a control station to transmit control signals from the control station across a non-real-time network to a local control panel (LCP);

converting and transmitting the control signals from the control station across a real-time network to at least one distributed control unit (DCU);

transmitting the control signals from the at least one DCU to the at least one piece of coiled tubing unit equipment;

sensing sensor data from at least one piece of coiled tubing unit equipment and transmitting the sensor data across the real-time network from at least one DCU to the LCP;

converting and transmitting the sensor data from the LCP across a non-real-time network to at least one output device at the control station: wherein the LCP bridges communication between the non-real-time network and the real-time network; and wherein the at least one DCU comprises a power pack DCU, a coiled tubing reel DCU, and an injector head/ BOP DCU, the method further comprising:

transmitting and sharing the sensor data among one or more of the power pack DCU, the coiled tubing reel DCU, the injector head/BOP DCU, and LCP; and calculating fail-safe parameters and comparing against a pre-loaded operating envelope and automatically transmitting control signals from one or more of the power pack DCU, the coiled tubing reel DCU, and the injector head/BOP DCU, to other DCU's on the real-time network and the LCP when the pre-loaded operating envelope is violated.

7. A method for distributed control of a coiled tubing unit comprising:

operating an input device at a control station to transmit control signals from the control station across a non-real-time network to a local control panel (LCP);

converting and transmitting the control signals from the control station across a real-time network to at least one distributed control unit (DCU);

transmitting the control signals from the at least one DCU to the at least one piece of coiled tubing unit equipment;

sensing sensor data from at least one piece of coiled tubing unit equipment and transmitting the sensor data across the real-time network from at least one DCU to the LCP;

converting and transmitting the sensor data from the LCP across a non-real-time network to at least one output device at the control station; wherein the LCP bridges communication between the non-real-time network and the real-time network; and wherein the at least one DCU comprises a power pack DCU, a coiled tubing reel DCU, and an injector head/ BOP DCU, the method further comprising:

storing sensor data from one or more of the power pack DCU, the coiled tubing reel DCU, the injector head/ BOP DCU, and the LCP in a memory storage device; and calculating fail-safe parameters based on the stored sensor data and comparing against a pre-loaded operating envelope and automatically transmitting control signals to one or more of the power pack DCU, the coiled tubing reel DCU, and the injector head/BOP DCU when the pre-loaded operating envelope is violated.

8. A method for distributed control of a coiled tubing unit comprising:

operating an input device at a control station to transmit control signals from the control station across a non-real-time network to a local control panel (LCP);

converting and transmitting the control signals from the control station across a real-time network to at least one distributed control unit (DCU);

transmitting the control signals from the at least one DCU to the at least one piece of coiled tubing unit equipment;

sensing sensor data from at least one piece of coiled tubing unit equipment and transmitting the sensor data across the real-time network from at least one DCU to the LCP;

converting and transmitting the sensor data from the LCP across a non-real-time network to at least one output device at the control station; wherein the LCP bridges communication between the non-real-time network and the real-time network; and wherein the at least one DCU comprises a power pack DCU, a coiled tubing reel DCU, and an injector head/ BOP DCU, the method further comprising:

loading and operating envelope in the LCP;

transmitting and sharing the sensor data among one or more of the power pack DCU, the coiled tubing reel DCU, the injector head/BOP DCU when the operating envelope is violated.

9. A method for distributed control of a coiled tubing unit comprising:

operating an input device at a control station to transmit control signals from the control station across a non-real-time network to a local control panel (LCP);

converting and transmitting the control signals from the control station across a real-time network to at least one distributed control unit (DCU);

transmitting the control signals from the at least one DCU to the at least one piece of coiled tubing unit equipment;

sensing sensor data from at least one piece of coiled tubing unit equipment and transmitting the sensor data across the real-time network from at least one DCU to the LCP;

converting and transmitting the sensor data from the LCP across a non-real-time network to at least one output device at the control station: wherein the LCP bridges communication between the non-real-time network and the real-time network; and wherein the at least one DCU comprises a power pack DCU, a coiled tubing reel DCU, and an injector head/ BOP DCU, the method further comprising:

loading an operating envelope in a memory storage device;

transmitting and sharing the sensor data among one or more of the power pack DCU, the coiled tubing reel DCU, the injector head/BOP DCU, and the LCP; and transmitting control signals to one or more of the power pack DCU, the coiled tubing reel DCU, and the injector head/BOP DCU when the operating envelope is violated.

10. A system for distributed control of a coiled tubing unit, the coiled tubing unit including a power pack, a coiled tubing reel, an injector head, and a BOP, the system comprising:

a master control station, including at least one input device and at least one output device, to operate the coiled tubing unit;

a local control panel (LCP);

a power pack distributed control unit (DCU) to control operation of the power pack;

a coiled tubing reel DCU to control operation of the coiled tubing reel;

an injector head/BOP DCU to control operation of the injector head and the BOP;

a non-real-time network to send signals between the master control station and the LCP; and a real-time network to send signals between the LCP, the power pack DCU, the coiled tubing reel DCU, and the injector head/BOP DCU.

11. The system of claim 10, wherein the non-real-time network is an Ethernet network.

12. The system of claim 10, wherein the non-real-time network is a token ring.

13. The system of claim 10, wherein the real-time network is a controller area network (CAN).

14. The system of claim 10, wherein the real-time network also uses a sensor network to send sensor signals from sensors to the LCP.

15. The system of claim 10, wherein the master control station is positioned proximate the coiled tubing unit.

16. The system of claim 15, further comprising at least one video input device positioned proximate the coiled tubing unit to send video signals to at least one electronic display located proximate the master control station.

17. The system of claim 15, further comprising at least one sound input device proximate the coiled tubing unit to transmit sound signals from the coiled tubing unit to at least one sound output device proximate the master control station.

18. The system of claim 10, further comprising an ancillary control station to monitor operation of the coiled tubing unit.

19. The system of claim 10, wherein the master control station is located remote from the coiled tubing unit.

20. The system of claim 19, further comprising at least one video input device positioned proximate the coiled tubing unit to send video signals to at least one electronic display located proximate the control station.

21. The system of claim 19, further comprising at least one sound input device proximate the coiled tubing unit to transmit sound signals from the coiled tubing unit to at least one sound output device proximate the master control station.

* * * * *

UNITED STATES PATENT AND TRADEMARK OFFICE
CERTIFICATE OF CORRECTION

| | |
|---|---|
| PATENT NO. | : 6,968,905 B2 |
| DATED | : November 29, 2005 |
| INVENTOR(S) | : Adnan et al. |

Page 1 of 1

It is certified that error appears in the above-identified patent and that said Letters Patent is hereby corrected as shown below:

<u>Column 13,</u>
Line 23, after "across a" delete "non-".
Line 26, after "when the" delete "non-".

Signed and Sealed this

Eleventh Day of April, 2006

JON W. DUDAS
*Director of the United States Patent and Trademark Office*